Oct. 17, 1967 E. FRISCH 3,347,552
CONTROLLED LEAKAGE FACE TYPE SEALS
Filed June 4, 1964

WITNESSES
Theodore F. Wrobel
James F. Young

INVENTOR
Erling Frisch
BY Zygmund L. Jermer
ATTORNEY

United States Patent Office 3,347,552
Patented Oct. 17, 1967

3,347,552
CONTROLLED LEAKAGE FACE TYPE SEALS
Erling Frisch, Pittsburgh, Pa., assignor to Westinghouse Electric Corporation, East Pittsburgh, Pa., a corporation of Pennsylvania
Filed June 4, 1964, Ser. No. 372,518
10 Claims. (Cl. 277—27)

This invention is directed generally to sealing devices for the sealing of fluids, and more particularly to face type seals for maintaining a pressure boundary for a pressurized fluid system where controlled, limited leakage through the seals is permitted.

In accordance with the prior art, face type limited leakage seals for movable members such as for rotating shafts have been provided wherein a floating seal ring is mounted in juxtaposed relationship with a moving surface of a ring or runner forming a part of or mounted on the shaft. The seal ring is provided with a surface thereon positioned adjacent to the runner surface and spaced from the latter in an amount sufficient to provide adequate fluid film thickness or gap therebetween. The thickness of this gap controls the amount of leakage passing between the seal surfaces from the high pressure to the low pressure regions. The seal ring is constructed in such a manner as to maintain automatically a small separation between the adjoining surfaces of the runner and the seal ring at a predetermined amount, which amount, for normal operating conditions, depends in magnitude almost entirely upon the geometry of the seal ring.

By virtue of the particular shape of the members and by virtue of the pressure distribution in the gap separating the floating seal ring and the runner, a restoring force is exerted upon the floating seal member in the event the thickness of the fluid film is varied. In other words, the variation of the fluid film thickness disturbs an equilibrium pressure distribution in the film region and the hydraulic forces in the system act to restore the equilibrium pressure distribution. For face type seals, there must be provided a means for creating a desired equilibrium pressure distribution in the seal gap which opposes a constant pressure acting on the seal ring in the opposite direction tending to close the seal gap.

It is to be realized that the creation of an equilibrium pressure distribution in the seal face gap results in an arrangement wherein the floating member is always maintained in spaced relationship with the seal runner. Since there is no contact between the sealing surfaces there is substantially no wear so that the seal assembly has a long life and is easily maintained.

Pursuant to the prior art, such means may comprise fluid orifices formed in the floating seal member for admitting pressurized fluid to a circular region intermediate the extremities of the seal runner face.

In accordance with other forms of the prior art, there is provided a means for maintaining a controlled separation between the seal ring and the runner by constructing the complementary surface of the floating seal member in a stepped manner. Such construction, however, requires the step to be on the order of 0.0005 inch or less. Thus, the surface of the floating member is provided with two parallel offset portions with the lateral spacing therebetween being for example .4 mil±.05 mil. The construction of two parallel surfaces offset by such small amounts poses an extremely difficult, machining problem particularly in view of the desire to use extremely hard materials for the seal members and the high surface finish required.

Another problem with such face type seals lies in the fact that the fluid utilized with such seals often includes therein small particles of solid material. Such particles, entering the seal at the widest separation, may become trapped at the break in the seal surface and may cause erosion at this point.

Accordingly, it is an object of this invention to provide a new and improved controlled leakage face type seal having a novel means for producing an equilibrium pressure distribution on the seal ring.

A further object of this invention is to provide a new and improved face type controlled leakage seal, having means for preventing particles of extraneous material from entering the gap between the seal surfaces.

A further object of this invention is to provide a new and improved face type controlled leakage seal, having complementary surfaces formed on juxtaposed surfaces of movable and floating members, respectively, to control the gap between seal surfaces, with one of the juxtaposed surfaces being machined in a relatively inexpensive manner to produce a predetermined pressure distribution on the floating member.

Briefly, the present invention accomplishes the above-cited objects by providing a face type controlled leakage seal which maintains automatically a predetermined gap between seal surfaces depending mainly upon the geometry of the seal ring. In the event of displacement of one of the seal parts relative to the other caused by vibration or misalignment of the seal runner on the shaft, hydraulic forces act upon the seal to reposition the displaced member. Such hydraulic forces are created in accordance with this invention by providing a slight taper on the fluid inlet side of the otherwise optically flat seal ring face. The same effect may be obtained equally well by providing a taper on the seal runner face. Such tapering of the seal member surface may be achieved by relatively simple machining procedures.

In order to avoid the possibility of extraneous materials clogging the seal gap, means are provided to force such extraneous materials away from the fluid entry side of the seal gap. Such means may comprise a centrifugal impeller which creates forces on such particles, when the particles have a higher density than the fluid medium, to move the particles away from the seal gap.

Further objects and advantages of this invention will become more apparent as the following detailed description proceeds and features of novelty which characterize the invention will be pointed out in particularity in the claims annexed to and forming a part of this specification.

For a better understanding of this invention reference may be had to the accompanying drawings, in which.

Figures 1, 2, 3:
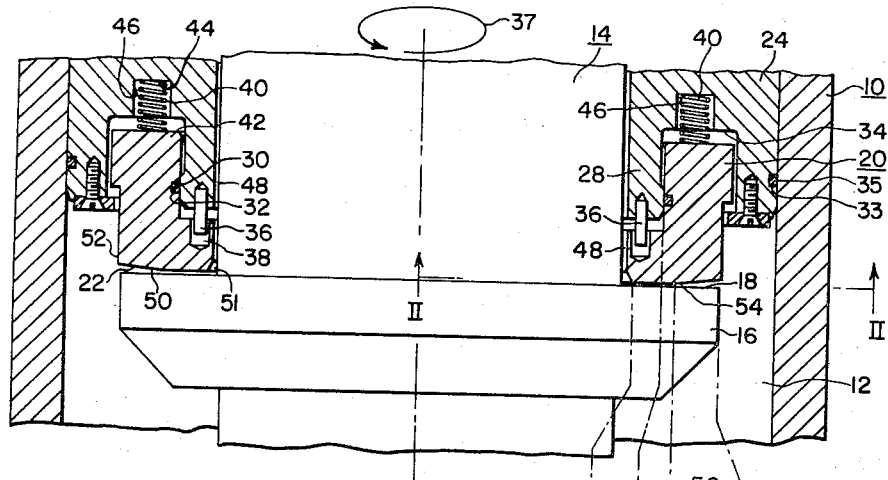
FIGURE 1 is a sectional view of a seal arrangement constructed in accordance with the principles of this invention showing a movable shaft in elevation, and including therein a graphical illustration of the hydraulic pressures exerted on the floating seal ring.
FIG. 2 is a sectional view of the seal arrangement of FIG. 1 and taken along the line II—II thereof.
FIG. 3 is a sectional view, partially in elevation, of another form of the seal arrangement of this invention.

In accordance with the invention and referring now to FIGS. 1 and 2, there is provided a housing 10 which is adapted to form a pressure chamber therein, indicated by the reference character 12. A movable body such as a shaft 14 is mounted within the housing 10 and is provided with a laterally extending runner 16 thereon having an upwardly facing lateral surface 18 of annular configuration. A seal ring 20 desirably is positioned within the pressure chamber 12 intermediate the housing 10 and shaft 14 and is provided with a lower surface 22 confronting the surface 18 of the runner 16. A seal retaining member 24 of annular configuration is fixedly positioned within the housing 10 and receives a portion of the shaft 14 in the central opening thereof. The retaining member 24 includes a downwardly extending portion 28 disposed intermediate the shaft 14 and a portion of the seal ring 20. The retainer 24, portion 28 and housing 10 form the extremities of the pressure chamber 12. In order to prevent leakage from the pressure chamber 12 along the path intermediate the downwardly extending portion 28 in the seal ring 20, suitable means such as an O-ring 30 is disposed in an annular groove 32 formed in the seal ring 20 and juxtaposed to the downwardly extending retainer portion 28. The O-ring 30 desirably is mounted in compression between the retainer portion 28 and the seal ring 20 to prevent fluid leakage therepast, yet the O-ring 30 desirably is formed from a resilient material to permit relative axial movement between the seal ring 20 and the retainer portion 28. In addition a circumferential groove 33 is formed in the outer surface of the retainer 24 adjacent the housing 10 with the groove 33 receiving a sealing means such as an O-ring 35 to prevent the flow of fluid from the high pressure region 12 along the path between housing 10 and retainer 24.

The seal ring 20 desirably is mounted for limited axial movement relative to the shaft 14 and runner 16. In furtherance of this purpose, the seal ring 20 is movable intermediate the surface 18 and a lower surface 34 on the retainer 24. Since the shaft 14 is mounted for rotation in the housing 10 as illustrated by the arrow 37, it is desirable to prevent seal member 20 from rotation. A plurality of anti-rotational pins 36 are fixedly mounted in the retainer portion 28 and are disposed to fit loosely in recesses 38 formed in the seal ring 20. Means are provided for biasing the surface 22 of the seal ring 20 into engagement with the runner surface 18. One example of such means comprises symmetrically spaced coil springs 40 which are disposed in compression between the upper surface 42 of seal ring 20 and an inward surface 44 formed in recesses 46 within retainer 24.

In accordance with the operation of the invention, it is desired to provide a pressure barrier between the high pressure chamber 12 and the annular low pressure region 48 adjacent the shaft 14 and formed by the retainer 24. The seal ring 20 is utilized as the pressure barrier means, but in accordance with the operation of this invention permits a controlled amount of leakage flow to the region 48 from the pressure chamber 12 along the seal gap as denoted by reference character 50 and formed between the confronting surfaces 18 and 22 of the runner 16 and seal ring 20, respectively. The seal gap 50 extends between a high pressure extremity 52 and a low pressure extremity 51 of the seal ring 20. The thickness of the fluid in the gap 50 and consequently, the amount of leakage flow through the gap 50 is determined by the shape of the seal ring 20.

In order to obtain a self-restoration of the relative position of the seal ring 20 and runner 16 upon a variation in the seal gap 50 caused by vibration or runner misalignment (wobble), it is necessary to provide a fluid flow path of decreasing thickness from the high pressure edge 52 to positions intermediate to the seal face extremities. More specifically, the last mentioned positions would comprise, in this example of the invention, a decreasing flow path thickness in the region between the outer edge 52 and an intermediate concentric circle 54 (FIG. 2) disposed on the confronting surface 22.

In accordance with the invention, the decreasing flow path thickness is formed by tapering the surface 22 slightly away from the confronting surface 18 of the runner 16 between the circle 54 and the outer edge 52 of the seal ring 20. Accordingly, for a predetermined leakage flow, there is an increase in flow velocity between the concentric circles 52 and 54 with such flow velocity increase corresponding in magnitude to the decrease of the thickness of the flow path caused by the tapering of the confronting surface 22.

The self-restoring feature of the seal ring 20 is best understood after a consideration of the hydraulic force diagram of FIG. 1. In the digram of FIG. 1, the area enclosed by the lines 56, 58 and dotted lines 60, 60A and 60B depicts the magnitude of the total force exerted downwardly on the seal ring 20 and always tending to close the seal gap 50. The area enclosed by lines 56, 58 and 62 depicts the lifting force exerted on the seal ring 20 when the thickness of the gap between confronting surfaces of seal ring 20 and runner 16 is less than the equilibrium thickness.

In the latter position of the seal ring 20, the magnitude of the upward forces as depicted by the area enclosed by lines 56, 58 and 62 exceeds the downward forces as depicted by lines 56, 58, 60, 60A and 60B, resulting in lifting of the ring 20 to increase the seal gap to equilibrium size.

The area enclosed by lines 56, 58 and 64 depicts the upward forces of pressure exerted on the seal ring 20 when the thickness of the seal gap 50 exceeds the equilibrium thickness. The magnitude of the forces depicted by the area formed by lines 56, 58 and 64 is smaller than and opposite in direction to the constant downward force as enclosed by lines 56, 58, 60, 60A and 60B, so that there is exerted upon the seal ring a net downward force moving the seal ring downwardly and reducing the seal gap 50 to its equilibrium value.

When the seal gap 50 is at its equilibrium size, the upward force on the seal ring 20 corresponds in magnitude to the area enclosed by lines 56, 58 and 66, and is equal to and opposite to the constant downward force on the seal ring 20 as defined by lines 56, 58, 60, 60A and 60B. Thus, the seal ring 20 will be urged to remain at the equilibrium position.

It will therefore be appreciated that for any given condition, only one equilibrium seal gap 50 exists and that for any variation of the position of the seal ring from the equilibrium position, there is created a substantial force tending to return the seal ring 20 to the equilibrium position.

Considering now a specific example of the invention, a seal ring 20 constructed for a shaft 14 having a diameter of 8 inches may be formed to have a radial dimension of 1½ inches (the distance between edges 51 and 52). For a given geometry of the seal ring the seal face separation, under equilibrium conditions, may be on the order of 0.0003 inches adjacent edge 51. The concentric circle 54 may be positioned equidistantly between the circles formed by edges 51 and 52 and the seal separation adjacent edge 52 may be between 0.0006 and 0.0007 inches. The portion of the seal ring intermediate circles 54 and 52 desirably is evenly tapered to recede from the runner so that the maximum extent of the taper (at edge 52) is between .0003 and 0.0004 inch. With such a construction, the amount of leakage through the film producing region 50 will be on the order of one gallon per minute, at a pressure differential of 2000 p.s.i. The restoring forces for a displacement of 0.0001 inch from the equilibrium position would be on the order of 2000 pounds. Since the weight of the seal ring does not exceed thirty pounds, it is to be realized that extremely high restoring forces are imposed upon the seal ring 20 permitting the seal ring 20 to follow accurately any wobble of the runner 16 or any vibratory movement imparted to the shaft 14 without any appreciable change in seal separation.

It is to be realized that the construction of a seal ring 20 wherein an annular area between circles 54 and 52 tapers gradually and evenly away from a confronting surface of runner 16 with the total depth of the taper at its maximum extent being on the order of 0.0003 and 0.0004 inch results in a construction wherein equilibrium pressure distribution is produced in the seal gap. This equilibrium pressure distribution produces restoring forces on the order of 2000 pounds in the event a disturbance of the equilibrium seal gap occurs. The construction of the seal ring 20 with the taper thereon can be performed with relatively conventional equipment resulting in a relatively easily constructed seal member 20.

The springs 40 are utilized in the seal construction solely for the purpose of closing the seal gap 50 when there is a very small pressure drop across the ring 20. The springs 40 are weak springs when compared with the system fluid forces and thereby do not add in any substantial manner to the fluid forces acting on the seal ring 20 during normal high pressure operation.

Referring now to the embodiment of this invention illustrated in FIG. 3, it will be appreciated that the seal ring arrangement of FIG. 3 is the same as that illustrated in FIGS. 1 and 2 and like parts will be depicted by the same reference characters primed.

The arrangement of FIG. 3 comprises a means for preventing the clogging of the confronting surfaces of the seal gap 50 is on the order of 0.0003 inch, it will be be carried in the fluid flowing through the seal gap 50'.

In the example of the invention described in detail in conjunction with FIG. 1 wherein the minimum equilibrium seal gap 50 is on the order of 0.0003 inch, it will be realized that solid particles, suspended in the liquid and carried to the seal gap 50, fall into three size categories. Particles, less than 0.0003 inch in diameter, pass through the seal gap 50 without incident. Particles, ranging from 0.0003 to 0.0007 inch in diameter, entering the seal spacing, will be ground down to the smaller size between the hard sloping seal surfaces and will pass between the inner parallel surfaces into the low pressure region 48'. Such particles will not damage the seal, since it is expected that any particle suspended in the liquid will be considerably softer than the seal surfaces, particularly where the seal surfaces are formed from hard materials, such as Stellite, tungsten or tungsten carbide.

Without the FIG. 3 arrangement, particles too large to enter the seal spacing or film producing region 50' (larger than 0.0007 inch) will be trapped at the inlet edge 52' by the rapidly flowing fluid in that area. The particles will be set into a rolling motion by the rotation of the runner 16' and may conceivably cause erosion of the seal lips.

To prevent the trapping of particles adjacent edge 52', there is desirably provided a means for carrying particles away from the seal gap region. Such means may comprise an impeller 70 of a generally cup-shaped configuration with its lower end 72 having an opening therein which fits on shaft 14'. The lower end 72 is positioned between a shoulder 76 and the lower surface of runner 16 so that impeller 70 is carried by shaft 14' and rotates therewith. A spacer tubing 74, through means not shown, forces seal runner and impeller cup against shaft shoulder 76 and prevents slippage of these parts. The upstanding portion 78 of impeller 70 is provided with a plurality of radially extending openings 80 therein, only one of which is shown in FIG. 3 with the openings 80 serving to centrifugally discharge liquid located between impeller 70 and runner 16'. The clearance between the upstanding portion 78 of impeller 70 and seal ring 20' is made as small as possible (on the order of 0.02 to 0.03 inch) without causing mechanical interference between the two parts. In addition, the outside diameter of the seal ring 20' is made slightly larger than that of runner 16'. Upon rotation of shaft 14', the openings 80 serve as a centrifugal impeller producing a high rate of liquid flow in the gap 82 adjacent edge 52' of the seal ring 20'. The high velocity of the liquid in gap 82 causes suspended particles, which have a much higher specific gravity than that of the liquid, to continue straight down past the edge 52' and into openings 80 rather than to make the sharp turn to reach the seal gap 50'. Below the edge 52', the clearance 84 between impeller 70 and runner 16' is made even smaller, to increase the flow rate through clearance 84. Thus, particles passing through clearance 82 will be diverted into clearance 84 and therefrom to the bottom 72 of impeller 70 instead of being recirculated through openings 80. Any particle accidentally caught on the runner 16' will assume the surface velocity of the runner, assisted by several shallow axial grooves 86 formed in runner 16' and will be forced out into the downward fluid stream created by impeller 70.

It will be realized that the specific sizes and dimensions of the seal rings 20 and 20', shafts 14 and 14' and the specific pressures referred to herein are merely illustrative of specific constructions in this invention and are not limitive thereof. Other sizes of shafts, seal rings and the like for use in systems having different pressure distributions fall within the scope of this invention.

It will be further appreciated by those skilled in the art that the specific embodiments of this invention described with particularity herein may be varied in certain respects without departing from the broad spirit and scope of this invention. Accordingly, it is specifically intended that the embodiments of this invention be interpreted as illustrative thereof rather than as limitive thereof.

I claim as my invention:

1. A fluid seal assembly comprising a rotatable shaft having a flat radially extending surface thereon, housing means receiving said shaft and having walls thereon defining a pressure chamber therein, a seal ring having a pair of opposed generally radial surfaces thereon, said ring receiving said shaft in the opening thereof and mounted in said housing means in axial floating relationship with said radial shaft surface, one of said radial ring surfaces being exposed during operation of said assembly to said pressure chamber, the other of said radial ring surfaces confronting said radial shaft surface and being spaced therefrom when said chamber is pressurized to form a seal gap therebetween, said other ring surface having one extremity thereof exposed to said pressure chamber and having the other extremity thereof exposed to a relatively low pressure region in said housing means, said other ring surface having a tapered portion intermediate said extremities and extending to said one extremity thereof, said portion being tapered to gradually increase the thickness of said seal gap to a maximum thickness adjacent said one extremity of said ring and the remainder of said other seal ring surface being flat and extending parallel to said shaft radial surface, sealing means disposed between said seal ring and an adjacent stationary wall portion of said chamber at a position on said seal ring intermediate said one radial ring surface and said other radial ring surface, and said sealing means, said seal ring and said housing means walls being relatively positioned to prevent fluid flow from said pressure chamber to said low pressure region except along said seal gap.

2. In a seal assembly, a rotatable shaft having a radially extending flat annular surface thereon, a seal ring mounted on said shaft and having a pair of generally opposed radial surfaces formed thereon, said ring being axially movable relative to said shaft, one of said seal ring radial surfaces confronting said shaft radial surface, a hollow housing means having stationary walls thereof defining a fluid pressure chamber therein and receiving said shaft and said seal ring therein, said other seal ring radial surface and the outer edge of said one seal ring radial surface being exposed to said pressure chamber, the inner edge of said one seal ring radial surface being exposed to a region of relatively low pressure disposed adjacent said shaft, so that fluid flows from said pressure chamber to said low pressure region along a path between said confronting surfaces, said one seal ring surface having an annular portion thereof adjacent said ring outer edge gradually tapered inwardly of said ring to form a convergent seal gap in the direction of fluid flow, the remainder of said one seal ring surface being flat and extending parallel to said shaft radial surface, sealing means interposed between said seal ring and an adjacent stationary wall portion of said housing means, and said sealing means, said seal ring and said housing means walls being relatively positioned to prevent fluid flow from said pressure chamber to said low pressure region except along said seal gap.

3. A fluid seal comprising a movable body member having a surface thereon, a housing defining a pressure chamber and receiving said body member therein, a seal member disposed within said housing in lateral floating relationship with respect to said body member surface, said sealing member having a pair of generally opposed surfaces with one of said surfaces being disposed complementarily to said body member surface and the other of said pair of opposed surfaces being exposed to a quantity of fluid under pressure during operation of said assembly, said seal member having one extremity of said one surface thereof exposed to said pressurized fluid and another extremity of said last-mentioned surface exposed to a low pressure region within said housing, said complemental surfaces being spaced from one another when said chamber is pressurized to form a seal gap, whereby fluid passes from said pressure chamber through said seal along a path extending from said one extremity of said one seal member surface to said other extremity thereof, means for preventing extraneous matter from entering said film producing region from said pressure chamber, said means including fluid flow inducing means positioned to cause the flow of fluid away from said one extremity of said one surface.

4. A fluid seal comprising a movable body member having a surface thereon, a housing defining a pressure chamber and receiving said body member therein, a seal member disposed within said housing in lateral floating relationship with respect to said body member surface, said sealing member having a pair of generally opposed surfaces with one of said surfaces being disposed complementarily to said body member surface and the other of said pair of opposed surfaces being exposed to a quantity of fluid under pressure during operation of said assembly, said seal member having one extremity of said one surface thereof exposed to said pressurized fluid and the other extremity of said last-mentioned surface being exposed to a low pressure region within said housing, said complementary surfaces being spaced from one another when said chamber is pressurized to form a seal gap therebetween, whereby fluid passes from said pressure chamber through said seal gap along a path extending from said one extremity of said one seal member surface to said other extremity thereof, means for preventing extraneous matter from entering said film producing region from said pressure chamber, said means including an impeller carried by said movable body and positioned in said pressure chamber to cause a flow of fluid away from said one extremity of said one surface.

5. A fluid seal assembly comprising a rotatable shaft having a radially extending surface thereon, a housing receiving said shaft therein and defining a pressure chamber, a seal ring having a pair of opposed generally radial surfaces thereon, said ring receiving said shaft in the opening thereof and mounted in said housing in axial floating relationship to said radial shaft surface, one of said radial ring surfaces being exposed during operation of said assembly to said pressure chamber, the other of said radial ring surfaces confronting said shaft surface, said confronting surfaces being spaced from one another when said chamber is pressurized to form a seal gap therebetween, said other ring surface having one edge thereof exposed to said pressure chamber and having the other edge thereof exposed to a relatively low pressure region in said housing, and means for preventing extraneous matter from entering said film producing region from said pressure chamber, said means including an impeller carried by said shaft and positioned to cause fluid flow adjacent said one edge laterally with respect to said seal gap.

6. A fluid seal assembly comprising a rotatable shaft having a radially extending surface thereon, a housing receiving said shaft therein and defining a pressure chamber, a seal ring having a pair of opposed generally radial surfaces thereon, said ring receiving said shaft in the opening thereof and mounted in said housing in axial floating relationship to said radial shaft surface, one of said radial ring surfaces being exposed during operation of said assembly to said pressure chamber, the other of said radial ring surfaces confronting said shaft surface, said confronting surfaces being spaced from one another when said chamber is pressurized to form a seal gap therebetween, said other ring surface having one edge thereof exposed to said pressure chamber and having the other edge thereof exposed to a relatively low pressure region in said housing, one of said confronting surfaces being tapered to recede from the corresponding portion of the other of said surfaces at positions adjacent said one edge of said ring, and means for preventing extraneous matter from entering said film producing region from said pressure chamber, said means including an impeller carried by said shaft and positioned to cause fluid flow adjacent said one edge laterally with respect to said seal gap.

7. A fluid seal assembly comprising a movable body member having a surface thereon, housing means having walls thereon defining a pressure chamber and receiving said body member therein, means forming separate high and low pressure regions in said pressure chamber, a sealing member disposed within said housing in lateral floating relationship with respect to said body member surface, said sealing member having a pair of generally opposed surfaces with one of said surfaces being disposed complementarily to said body member surface and the other of said pair of opposed surfaces being exposed to the high pressure region of said chamber during operation of said assembly, said sealing member having one extremity of said one surface thereof exposed to said high pressure housing region and the other extremity of said last-mentioned surface exposed to said low pressure region within said housing, said complemental surfaces forming a seal gap therebetween with the extremities of said seal gap being located in the high pressure region and low pressure region of said chamber, respectively, whereby fluid passes from said high pressure region through said seal gap to said low pressure region along a path extending from said one extremity of said one sealing member surface to the other extremity thereof, one of said complemental surfaces being substantially flat, the other of said complemental surfaces having a flat portion formed thereon located adjacent the low pressure extremity of said seal gap and extending parallel to said one complemental surface, said last-mentioned flat portion terminating intermediate the extremities of said seal gap, the remainder of said other complemental surface being tapered to recede away from said one complemental surface to enlarge progressively said seal gap in the direction between said flat portion of said other complemental surface and the high pressure extremity of said seal gap, whereby fluid in said high pressure region flows along said seal gap to said low pressure region first along a converging flow path formed between said one complemental surface and said remainder of said other complemental surface and then along a flow path of constant thickness formed by said one complemental surface and said flat parallel portion of said other complemental surface, sealing means interposed between said sealing member and an adjacent stationary wall portion of said chamber to prevent fluid flow between said sealing member and said adjacent wall portion, and said sealing means, the walls of said chamber and said sealing member being relatively positioned to prevent fluid flow from said high pressure region to said low pressure region except along said seal gap.

8. The seal assembly of claim 7 wherein said sealing member is shaped to induce hydraulic forces thereon to reposition said sealing member to an equilibrium position in the event of a variation of the thickness of said seal gap.

9. A fluid seal assembly comprising a rotatable shaft having a radially extending surface thereon, housing means receiving said shaft therein and having walls thereon defining a pressure chamber, a seal ring having a pair of opposed generally radial surfaces thereon, said ring receiving said shaft in the opening thereof and mounted in said housing means in axial floating relationship with said radial shaft surface, one of said radial ring surfaces being exposed during operation of said assembly to said pressure chamber, the other of said radial ring surfaces confronting said radial shaft surface, said confronting surfaces being spaced from one another when said chamber is pressurized to form a seal gap therebetween, said other ring surface having one edge thereof exposed to said pressure chamber and having the other edge thereof exposed to a relatively low pressure region in said housing means, one of said confronting surfaces being tapered to recede from the other of said surfaces to increase the thickness of said seal gap region in an area adjacent said one edge of said ring with the remainder of said one surface being flat, the other of said confronting surfaces being entirely flat and extending parallel to said remainder of said one confronting surface, said tapered portion of said one confronting surface having the taper thereof extending in a direction to form a convergent flow path along the seal gap portion between said tapered portion and said other surface in the direction along said seal gap extending from said one edge toward said other edge and a flow path of constant thickness along the remainder of said seal gap, sealing means interposed between said seal ring and a stationary wall portion of said housing to prevent fluid flow between said seal ring and said wall portion adjacent said sealing means, and the walls of said housing, said sealing means and said seal ring being relatively positioned to prevent fluid flow from said pressure chamber to said low pressure region except along said seal gap.

10. The fluid seal assembly of claim 9 wherein said seal ring is shaped to induce hydraulic forces thereon to reposition said ring to an equilibrium position in the event of a variation of the thickness of said seal gap.

References Cited

UNITED STATES PATENTS

| 2,221,225 | 11/1940 | Weis et al. | 103—112 |
| 2,814,512 | 11/1957 | Quinn et al. | 277—3 |
| 2,858,149 | 10/1958 | Laser | 277—81 X |
| 2,907,594 | 10/1959 | Macks | 277—23 |
| 2,910,313 | 10/1959 | La Bour | 277—91 X |
| 2,984,507 | 5/1961 | Welch | 277—27 |
| 3,001,806 | 9/1961 | Macks | 277—1 |
| 3,093,382 | 6/1963 | Macks | 277—27 |

OTHER REFERENCES

British Hydromechanics Research Association, International Conference on Fluid Sealing, "The Hydrostatic Gas-Bearing as a Non-Touching Gland for Rotating Shafts" by P. Lindhardt, April 1961 (5 pages).

SAMUEL ROTHBERG, *Primary Examiner.*